United States Patent [19]

Mohr

[11] Patent Number: 4,591,269

[45] Date of Patent: May 27, 1986

[54] ROTATION RATE MEASURING INSTRUMENT

[75] Inventor: Friedemann Mohr, Renningen, Fed. Rep. of Germany

[73] Assignee: International Standard Electric Corporation, New York, N.Y.

[21] Appl. No.: 555,905

[22] Filed: Nov. 29, 1983

[30] Foreign Application Priority Data

Dec. 3, 1982 [DE] Fed. Rep. of Germany ....... 3244713

[51] Int. Cl.$^4$ .......................... G01B 9/02; G01C 19/64
[52] U.S. Cl. ................................................ 356/350
[58] Field of Search ........................................ 356/350

[56] References Cited

U.S. PATENT DOCUMENTS 4,372,685 2/1983 Ulrich ................................. 356/350
4,410,275 10/1983 Shaw et al. ........................ 356/350

OTHER PUBLICATIONS

"Phase Nulling Optical Gyro", Cahill et al., Proceedings of the I.E.E.E. National Aerospace and Electronics Conference, 5-1979, pp. 8-13.
"Techniques for Shot Noise Limited Inertial Rotation Measurement Using a Multiturn Fiber Sagnac Interferometer", Davis et al., SPIE, vol. 157, 1978, pp. 131-136.

Primary Examiner—Vincent P. McGraw
Assistant Examiner—S. A. Turner

Attorney, Agent, or Firm—John T. O'Halloran

[57] ABSTRACT

In the rotation rate measuring instrument, two component beams derived from a light beam produced by a laser circulate around a coiled optical waveguide (radius R, length L) in opposite directions. From the phase difference between the two component beams due to the Sagnac effect, the rotation rate is determined. Before entering the optical waveguide, each of the two component beams is modulated in a modulator (5, 6) such that the phase differences $(2\nu+1)\pi/2$, $(2\nu+5)\pi/2$, and $(2\nu+3)\pi/2$ (where $\nu$ is an arbitrary integer) exist periodically between the two component beams emerging from the optical waveguide. The drive signals for the two modulators, which exhibit periodic frequency changes of 2F, are varied in such a way that the output of an optical-to-electrical transducer (2) to which the two component beams are directed after travelling around the optical waveguide provides a constant signal. To compensate for the Sagnac phase difference, an additional frequency difference of $\Delta f$ is required between the two drive signals. The rotation rate $\Omega$ is determined by the equation $$\Omega = \frac{\lambda \cdot C}{8RL} \cdot \frac{2(\nu+1)F - \Delta f}{F},$$

where $\lambda$ = vacuum wavelength of the light, and $C$ = velocity of light in vacuo.

11 Claims, 8 Drawing Figures

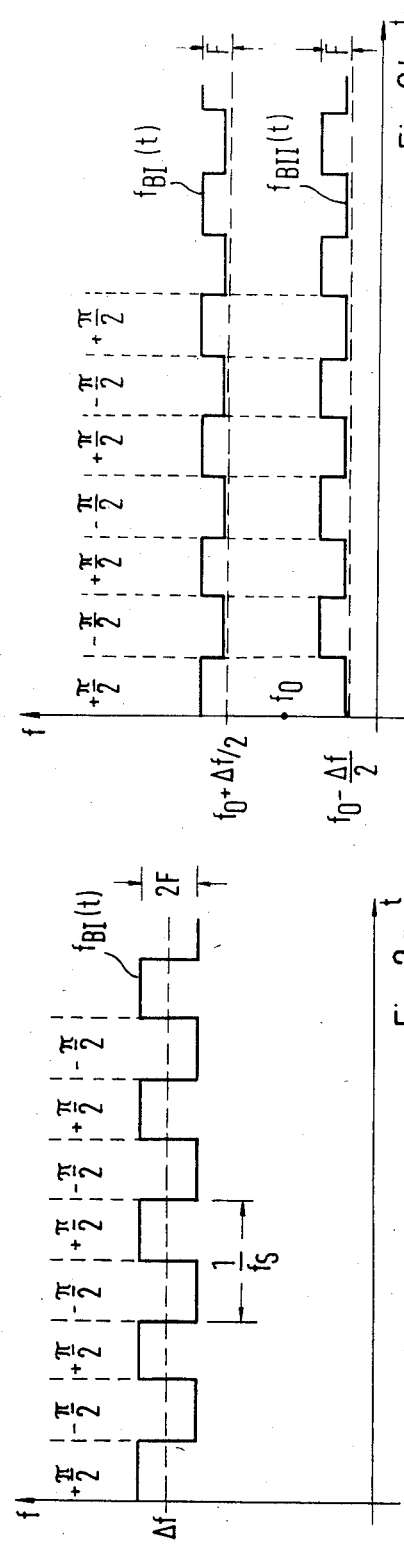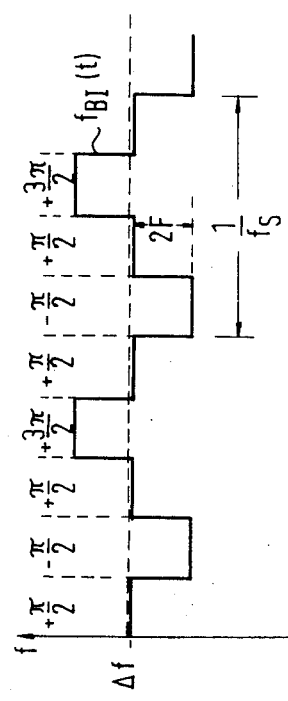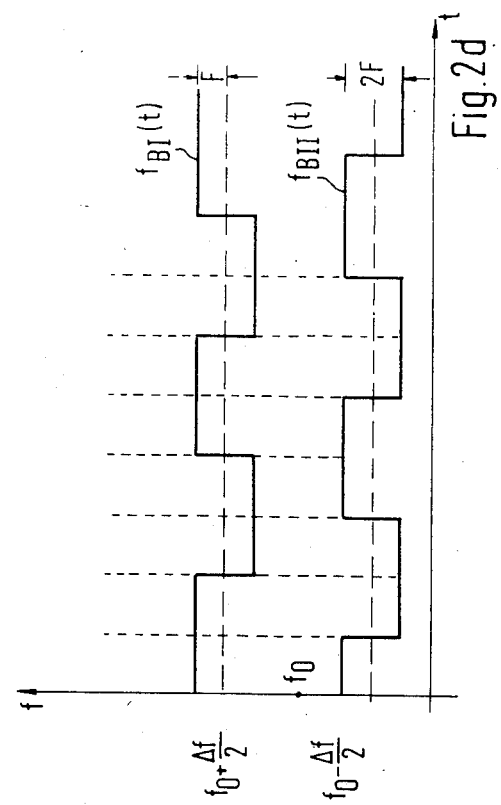

ROTATION RATE MEASURING INSTRUMENT

BACKGROUND OF THE INVENTION

The present invention relates to a rotation rate measuring instrument utilizing the Sagnac effect to determine the rotation rate. An instrument of this kind is described in German Patent Application No. P 31 36 688.

In the instrument described there, a light beam is split into two component beams which travel in opposite directions around an optical waveguide forming a closed light path. To achieve high measurement accuracy, it is desirable to operate the optical-to-electrical transducer at that point of its characteristic where a small change in the intensity of the light directed to the transducer causes a large change in the transducer's output signal. On the other hand, it is desirable to have an alternating-voltage signal for evaluation purposes. Both can be achieved by modulating the two component beams in a suitable manner. This will be illustrated by an example: For the modulators, Bragg cells are used. A Bragg cell is placed in front of each end of an optical waveguide, and the frequencies of the drive signals for the two Bragg cells are changed periodically. The modulating frequency is the frequency at which switching occurs between the different frequencies of the drive signals. The phase shift between the two component beams emerging from the optical waveguide depends on the frequencies of the drive signals for the two Bragg cells. These frequencies are so chosen that the phase difference between the two component beams is $(2\nu+1)\cdot\pi/2$ or $(2\nu+3)\cdot\nu/2$, where $\nu$ may be any positive or negative integer. The frequencies of the drive signals are changed at the modulating frequency $f_S$ so as to periodically produce one phase difference or the other.

When the measuring instrument is at rest, the output signal of the optical-to-electrical transducer to which the two component beams are directed after emerging from the optical waveguide is the same for both phase differences between the component beams. When the measuring instrument rotates, the phase difference caused by the Sagnac effect adds to the above-mentioned phase difference, and the output of the optical-to-electrical transducer provides an alternating-voltage signal having the frequency $f_S$ of the modulating signal. By controlling the frequencies of one or both drive signals, an additional phase difference is produced between the two component beams which is chosen so as to compensate for the Sagnac phase difference, i.e. the phase differences $(2\nu+1)\cdot\pi/2$ and $(2\nu+3)\cdot\pi/2$ are obtained again. From the control signal, the rotation rate $\Omega$ is determined.

If the compensation for the Sagnac phase difference $\Phi_S$ is performed at large values of $\nu$, the equation by which the rotation rate $\Omega$ is determined contains a large additive term which depends on $\nu$. The quantities of this term (length and refractive index of the optical waveguide) may drift and, consequently, cause measuring errors. Therefore, calibrations are performed in the prior art instrument at fixed time intervals. For the calibration, the frequencies of the drive signals for the Bragg cells are chosen so that a phase difference of $2\pi$ or an integral multiple thereof exists between the two component beams emerging from the optical waveguide.

SUMMARY OF THE INVENTION

The object of the invention is to provide a rotation rate measuring instrument in which the calibration is performed continuously.

This object is attained in that the drive signal for the modulator is chosen so as to periodically produce the phase differences $(2\nu+1)\pi/2$, $(2\nu+3)\pi/2$, $(2\nu+5)\pi/2$, and $(2\nu+3)\pi/2$, where $\nu$ is an arbitrary positive or negative integer, that the drive signal exhibits changes in frequency by $2F$, and that the rotation rate $\Omega$ is determined from the equation $$\Omega = \frac{\lambda C}{8RL} \cdot \frac{(2\nu+1)F - \Delta f}{F}$$

or from an equation derivable therefrom, where $\lambda$ is the vacuum wavelength of light, $C$ is the velocity of light in vacuo, $R$ is the radius of the coiled light path, $L$ is the length of the light path, and $\Delta f$ is the drive signal frequency shift required to compensate for the Sagnac phase difference $\Phi_S$.

In the novel instrument, any deviation of the variables entering into the measurement from their desired values is sensed and compensated for immediately, so that high measurement accuracy is achieved. No stringent requirements have to be placed on the frequency stability of the devices producing the drive signals for the modulators. The sign of the rotation can be determined in a simple manner.

The values $\nu$ as factors of the phase differences produced can be chosen to be very large. This is of advantage if Bragg cells are used for the modulators. Then, the useful signals are effectively separated in frequency from signals reflected at interfaces or scattered back from the fiber.

BRIEF DESCRIPTION OF THE DRAWING

Embodiments of the invention will now be explained in more detail with reference to the accompanying drawings, in which:

FIG. 2 shows modulating signals for the modulators of the known instrument (FIGS. 2a, 2b) and of the novel instrument (FIGS. 2c, 2d);

DETAILED DESCRIPTION OF THE PREFERRED EMBODIMENT

Figure 1:
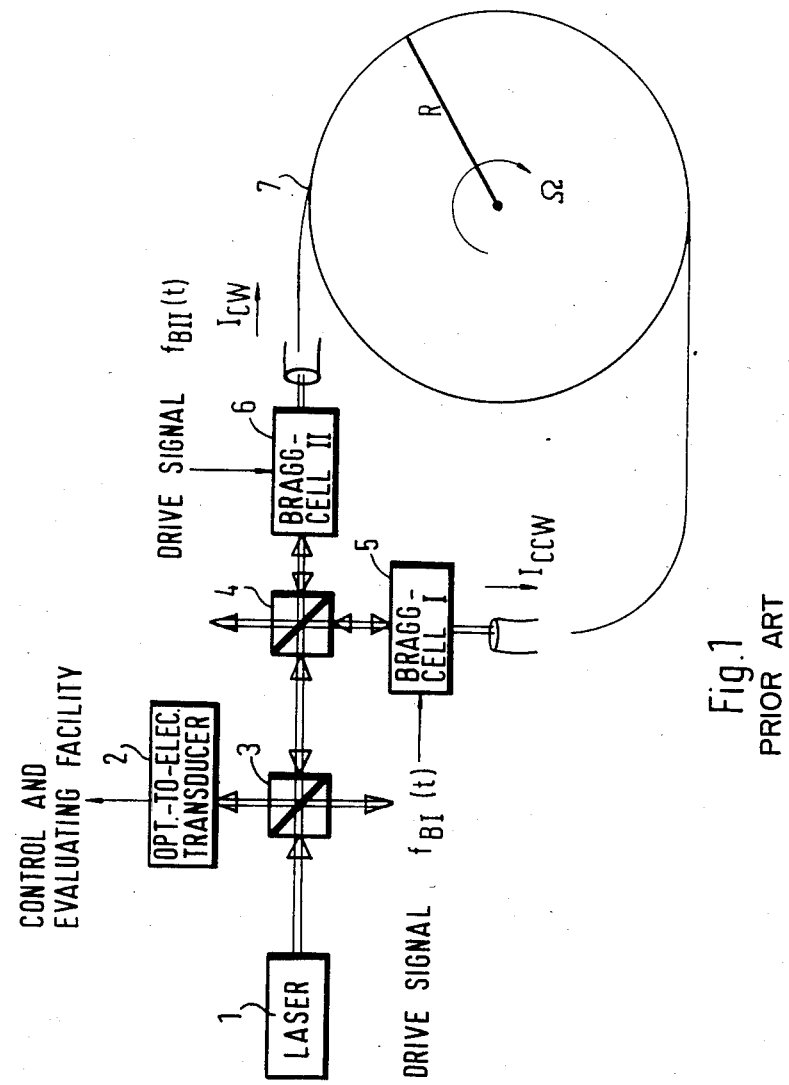
FIG. 1 is a block diagram of part of a known rotation rate measuring instrument.

First, those parts of a known rotation rate measuring instrument which are necessary to understand the novel measuring instrument will be explained with the aid of FIG. 1.

A light beam produced by a laser 1 is guided to a beam splitter 3. A portion of the light beam is directed to an additional beam splitter 4, another portion to an absorber (not shown). The additional beam splitter 4 produces two component beams which travel around a coiled (radius R) optical waveguide 7 in opposite directions. Inserted between the additional beam splitter 4 and the two ends of the optical waveguide are two Bragg cells 5 and 6, to which drive signals with the frequencies $f_{BI}(t)$ and $f_{BII}(t)$ are applied. The two component beams emerging from the optical waveguide are combined by the additonal beam splitter 4. This light beam is directed to the first beam splitter 3, which deflects a portion thereof to an optical-to-electrical transducer 2 followed by a control and evaluating facility.

At a rotation rate $\Omega=0$, the output signal of the optical-to-electrical transducer 2 is a DC voltage signal. If $\Omega \neq 0$, the transducer delivers an AC voltage signal of frequency $f_S \cdot f_S$ is the frequency at which switching occurs from one drive-signal frequency to the other. This AC voltage signal is eliminated, as will be explained with the aid of FIG. 2. The rotation rate is determined from the control signal (e.g. by means of the frequencies of the drive signals, whose frequencies are controlled by the control signal).

As already mentioned in the introductory part of the specification, the additional phase difference caused by the Sagnac effect $\Phi_S$ is compensated for. To do this, a frequency difference $\Delta f$ is required.

The drive signal $f_{BI}(t)$ has the waveform shown in FIG. 2a if only one Bragg cell is present in the arrangement of FIG. 1. The modulating signal is a signal at which periodic switching occurs between a first frequency value and a second frequency value (these values are separated by the frequency 2F) at the frequency $f_S$. At the first frequency value, a phase difference of $(2\nu+3)\cdot\pi/2$ is produced between the two component beams; at the second frequency value, a phase difference of $(2\nu+1)\cdot\pi/2$ is produced.

In the example illustrated in FIG. 2a, $\nu=-1$ for simplicity, i.e., phase differences of $+\pi/2$ and $-\pi/2$ are produced alternately. If $\Omega=0$, the average frequency is $f_0$ (for the phase differences chosen, $f_0=0$). In the presence of rotation, the average frequency is shifted to $f_0+\Delta f$, i.e., to $\Delta f$ in this case.

If, as shown in FIG. 1, two Bragg cells are present, two modulating signals $f_{BI}(t)$ and $f_{BII}(t)$ are needed. The two modulating signals are separated by a quarter of a cycle. During the time that the frequency of one of the modulating signals, $f_{BI}(t)$, is higher than $f_0+\Delta f/2$, the frequency of the other modulating signal, $f_{BII}(t)$, is equal to $f_0-\Delta f/2$. During the second half of a cycle, the reverse is true. If $\Omega=0$, then $\Delta f=0$, i.e., the average frequencies of the two modulating signals are equal. If $\Omega \neq 0$, i.e., $\Delta f \neq 0$, the average frequency of the first modulating signal becomes $f_0+\Delta f/2$, and that of the second modulating signal becomes $f_0-\Delta f/2$. The changes in the frequency of a modulaing signal are no longer 2F as in the case of the (single) modulating signal of FIG. 2a but only F.

In the following, it will be explained how the prior art instrument must be modified to permit continuous calibration.

The novel instrument, like the prior art instrument, can be implemented with one or two Bragg cells. It must only be ensured that the necessary phase differences are present between the two component beams emerging from the optical waveguide.

In the novel instrument, the following phase differences are produced in succession:

1. $(2\nu+1)\cdot\pi/2$
2. $(2\nu+3)\cdot\pi/2$
3. $(2\nu+5)\cdot\pi/2$
4. $(2\nu+3)\cdot\pi/2$ This sequence represents one cycle. $\nu$ is an arbitrary positive or negative integer. In the case of the drive signals shown in FIG. 2c and 2d, $\nu=-1$. Thus, the phase differences $-\pi/2$, $+\pi/2$, $+3\pi/2$, and $+\pi/2$ are produced if $f_0$ is chosen to be equal to zero for simplicity, as in FIG. 2a. In accordance with this staircase function of the phase differences to be produced, the frequencies of the modulating signal are changed by amounts of 2F. If two Bragg cells are used, two modulating signals $f_{BI}(t)$ and $f_{BII}(t)$ are needed again, as shown in FIG. 2b. Both modulating signals have a square waveform. The two modulating signals are in quadrature with each other. One of them has the frequencies $f_0+\Delta f/2+F$ and $f_0+\Delta f/2-F$, and the other the frequencies $f_0-\Delta f/2+F$ and $f_0-\Delta f/2-F$. Thus frequency differences $\Delta f$, $\Delta f+2F$, $\Delta f$, and $\Delta f-2F$ exist between the modulating signals in the four quarters of a cycle, so that the phase differences $-\pi/2$, $+\pi/2$, $+3\pi/2$, and $\pi/2$ are produced.

If two Bragg cells are present, these phase differences are thus obtained by driving each of the Bragg cells with a signal whose frequency curve is a square wave.

In the prior art instrument where phase differences of $+\pi/2$, and $-\pi/2$, are produced, the output of the optical-to-electrical transducer 2 provides a signal of frequency $f_S$, which is to be eliminated. The frequency $f_S$ is the frequency at which the differences in phase between the component beams vary due to the modulation in the Bragg cells. In the novel instrument, the transducer provides a signal containing three components to be separated from each other. The separation of these components and the subsequent signal processing will now be explained with the aid of FIGS. 3, 4, and 5.

The novel rotation rate measuring instrument is based on the prior art instrument described with the aid of FIG. 1. First, the generation of the drive signals for the Bragg cells will be explained with the aid of FIGS. 3 and 4.

Figure 3:
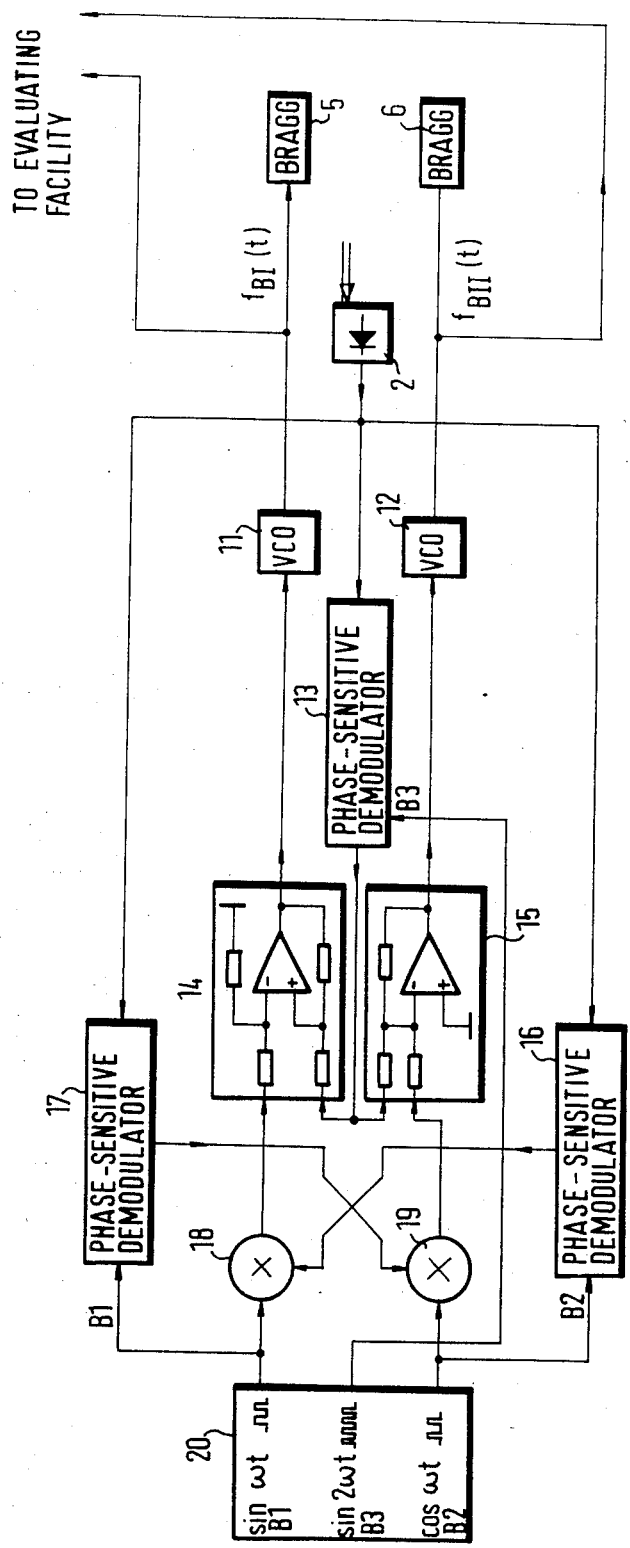
FIGS. 3 and 4 are block diagrams of two embodiments of the control portion of the novel instrument.

The block diagram of FIG. 3, like FIG. 1, shows the two Bragg cells 5, 6 and the optical-to-electrical transducer 2. The output signal of the latter is applied to three phase-sensitive demodulators 13, 16, 17. These phase-sensitive demodulators separate the three signal components contained in the output signal of the transducer, as mentioned above. To this end, different reference signals are applied to the three phase-sensitive demodulators 13, 16, 17, which are implemented as integrating lock-in amplifiers: a square-wave reference signal B1, derived from a signal $\sin \omega t$, is applied to the first lock-in amplifier 17, a square-wave reference signal B2, derived from a signal $\cos \omega t$, to the second lock-in amplifier 16, and a square-wave reference signal B3, derived from a signal $\sin 2\omega t$, to the third lock-in amplifier 13. The reference signals are synchronous with each other and are provided by a device 20. The frequency $\omega$ is an arbitrary value in the kHz range, which is preferably equal to a submultiple of the reciprocal of the time required by the light beam to travel around the optical waveguide.

A first multiplier 18 multiplies the reference signal B1, derived from $\sin \omega t$, by the output signal of the second lock-in amplifier 16, and a second multiplier 19 multiplies the reference signal B2, derived from $\cos \omega t$, by the output signal of the first lock-in amplifier 17. The output signals of the first multiplier 18 and the second multiplier 19 are fed to first and second adding stages 14 and 15, respectively. Both adding stages receive the output signal of the third lock-in amplifier 13 as the second input signal. They are implemented with suitably wired differential amplifiers in a manner known per se. The output signal of the first adding stage 14, which is a square wave, controls a voltage-controlled oscillator 11, which generates the drive signal $f_{BI}(t)$ for the first Bragg cell 5, and the square-wave output signal of the second adding stage 15 controls another voltage-controlled oscillator 12, which generates the drive signal $f_{BII}(t)$ for the second Bragg cell 6.

This system represents an automatic control system with three interconnected loops. In the steady state, the input signals for the lock-in amplifiers are zero. The drive signals $f_{BI}(t)$ and $f_{BII}(t)$ then have the waveform shown in FIG. 2d. The voltage-controlled oscillators 11, 12 are controlled to adjust the value 2F, by which their frequencies change, and the average frequency difference $\Delta f$ between the two output frequencies to the desired values.

By this control, the phase difference caused by the Sagnac effect, $\Phi_S$, is compensated for. To this end, the average frequencies of the voltage-controlled oscillators 11, 12, are shifted from their original value $f_0$ to values $f_0 + \Delta f/2$ and $f_0 - \Delta f/2$. The frequencies of the drive signals vary about these new average values by $\pm F$, i.e., each drive signal has frequency changes of 2F.

These frequency changes 2F are adjusted to compensate for variations (e.g. in the length L of the optical waveguide or in the refractive index n).

The lock-in amplifiers may be replaced by mixers each followed by an integral action controller.

Figure 4:
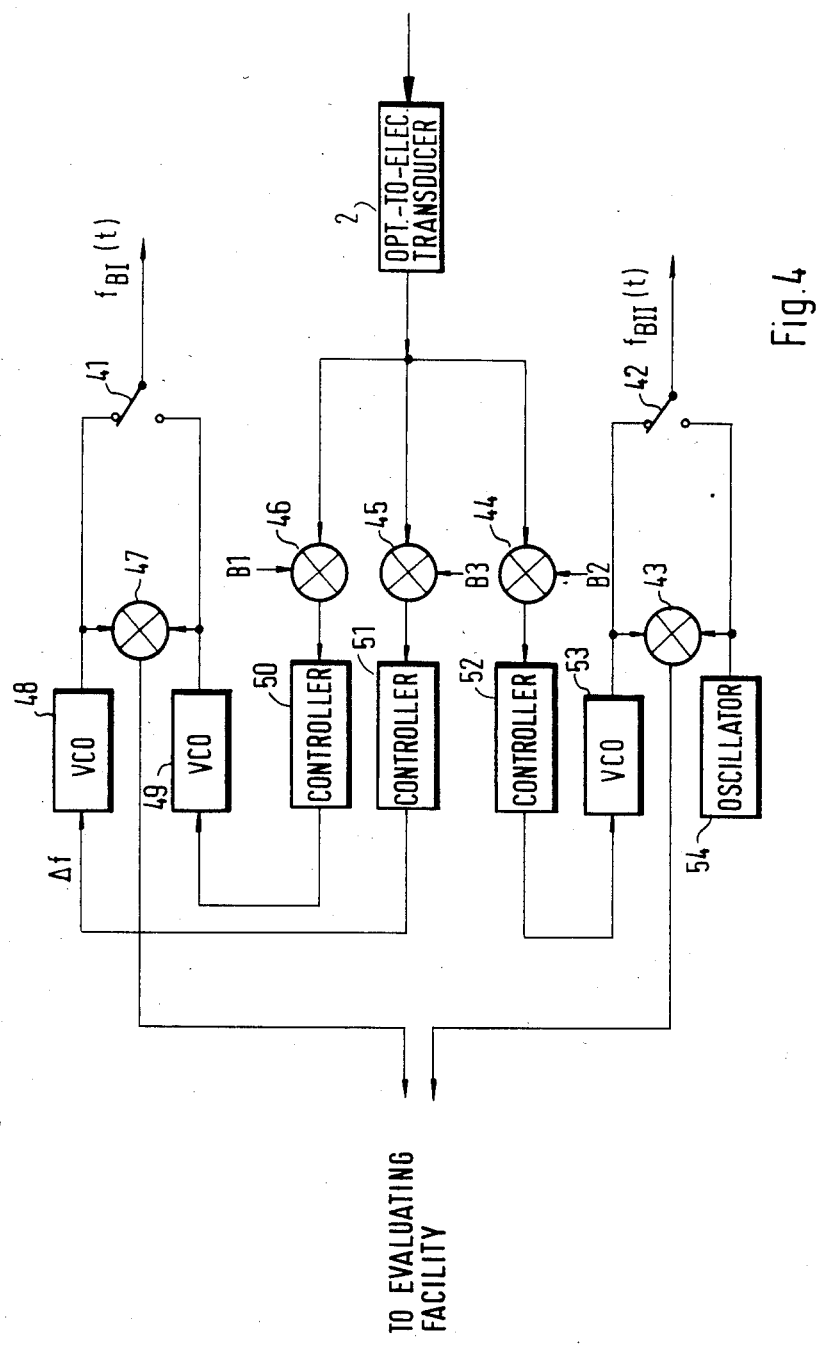

This solution is assumed in the embodiment of FIG. 4. This embodiment also differs from that of FIG. 3 in that each of the drive signals $f_{BI}(t)$ and $f_{BII}(t)$ is generated by two oscillators 48, 49 and 53, 54, respectively. The oscillator 54 is not controlled, while the other oscillators are voltage-controlled oscillators whose frequencies of oscillation are varied in a manner analogous to that in the embodiment of FIG. 3.

Switches 41, 42 are provided which are controlled at the frequency $\frac{1}{2}f_S$. Each of these switches transfers the output signal of either of the oscillators of an oscillator pair to the respective Bragg cell. Through the switching, the desired square waveform of the frequency characteristic of the drive signals is obtained.

In this embodiment, the frequency of the voltage-controlled oscillator 48 is varied so as to compensate for the Sagnac phase difference $\Phi_S$. The frequency of the second voltage-controlled oscillator 49 of this oscillator pair is varied so that the two output signals have such a frequency change 2F that the aforementioned variations are compensated for. The two output signals of the oscillators 48 and 49 are fed not only to the switch 41 but also to a mixer 47.

The same applies analogously to the oscillator pair 53 and 54. The frequency of the voltage-controlled oscillator 53 is varied so that the desired frequency change 2F is present between the output signals of the two oscillators. The output signals of the two oscillators are applied not only to the switch 42 but also to a mixer 43. From the mixer output signals, the rotation rate $\Omega$ is determined.

Besides the solutions explained with the aid of FIGS. 3 and 4, there are other ways of generating the drive signals, some of which are listed in the following:
(a) The desired phase differences are produced by means of a drive signal. Its frequency curve is a staircase waveform with a step height of 2F. Its average frequency is $f_0$ and is shifted in frequency by $\Delta f$ to compensate for the Sagnac phase difference $\Phi_S$ in the presence of rotation.
(b) The desired phase differences are produced by means of two drive signals.

(b1) Two oscillators each generate one drive signal whose frequency curve is a square wave; the frequency change is 2F. The two signals are separated in phase by one quarter-cycle.
The average frequency of the two drive signals is $f_0$. This frequency is shifted by $+\Delta f/2$ for one of the two signals, and by $-\Delta f/2$ for the other, in the presence of rotation.
The average frequency of the two drive signals is $f_0$. The frequency of one of the drive signals is shifted by $\Delta f$ in the presence of rotation.
(b2) Four oscillators each generate a signal of a (regulated) constant frequency. They form two pairs, and the two signals of each pair are applied to a switch which transfers one signal or the other as part of the drive signal. In this manner, two drive signals are generated whose frequency curve is a square wave.
For the respective frequency shifts, the above remarks apply analogously.

The novel instrument thus performs a control in which a frequency shift of $\Delta f$ is produced to compensate for the Sagnac phase difference $\Phi_S$, and a control in which the frequency changes by 2F of the drive signal(s) are adjusted to compensate for the afore-mentioned variations. To permit the control actions, the afore-mentioned phase differences $(2\nu+1)\cdot\pi/2$, $(2\nu+3)\cdot\pi/2$, and $(2\nu+5)\cdot\pi/2$ must be produced.

In the locked condition, in all embodiments, the rotation rate is determined, e.g. in a computer, by the equation $$\Omega = \frac{\lambda \cdot C}{8RL} \cdot \frac{(2\nu + 1)F - \Delta f}{F}$$

or by an equation derived therefrom, where
$\lambda$ = vacuum wavelength of the light
C = velocity of light in vacuo
R = radius of the coiled optical waveguide
L = length of the light path.

The quantities of the first expression are constants. Any deviations are contained in F. $\nu$ is a known quantity, too. Thus, F and $\Delta f$ have to be determined. These two quantities can be obtained in a simple manner by mixing suitable signals and then measuring the composite signal.

A solution for determining $\Omega$ in the embodiment of FIG. 3 will now be explained with the aid of FIG. 5. It will be assumed that two drive signals $f_{BI}(t)$ and $f_{BII}(t)$ (FIG. 3 in conjunction with FIG. 2d) are present.

The two drive signals $f_{BI}(t)$ and $f_{BII}(t)$ are fed to a mixer 61 followed by a low-pass filter 62. The output of the low-pass signal provides the signal $(f_{BII}-f_{BI})(t)$, which is fed to an additional mixer 64 and to a phase-locked loop 63. The phase-locked loop 63 has such a large time constant (approx. 0.1 sec) that it cannot track fast frequency changes and, thus, locks with the frequency $\Delta f$. The upper limit of the time constant is determined by the fact that the phase-locked loop can follow changes in the rotation rate $\Omega$. The phase-locked loop thus delivers a signal of frequency $\Delta f$. This signal is applied to an additional mixer 64 and to a switch 69.

The output of the additional mixer 64 is fed to an additional phase-locked loop 71, which contains a mixer 67, a loop filter 66, a voltage-controlled oscillator 65, and a divider 68. The input signal for the additional phase-locked loop has the frequency F and synchronizes the voltage-controlled oscillator 65, which is tuned to the center frequency $(2\nu+1)F$. The output of the oscillator 65 is fed to the divider 68, which divides by $(2\nu+1)$, so that its output signal, which is applied to the mixer 67 of the second phase-locked loop 71, has the frequency F again.

The two phase-locked loops are designed to provide pulsed signals. The latter have pulse repetition rates of $\Delta f$ and $(2\nu+1)F$, respectively, and are applied to an up/down counter 73 through the switches 69 and 70, respectively. They are the clock pulses for this counter.

The output signal of the divider 68 is also used to control the switches 69 and 70 and to reset the counter 73. The resetting of the counter 73 takes place at half the pulse repetition rate (F/2). Therefore, the counter is preceded by a divider 72.

The counter counts as follows:

The counter is reset; the switch 70 is closed, and the switch 69 open.

The counter now counts the clock pulses until the two switches 69, 70 are placed in their other positions.

With the next pulse of the pulse train provided by the divider 68, the switch 70 is opened; the switch 69 is closed.

The counter now counts—at the repetition rate $\Delta f$ of the clock pulses—until the next pulse from the divider 68 changes the positions of the switches 69, 70 again.

The count is now $[(2\nu+1)F-\Delta f]/F$.

The counter is reset to zero.

The count is written into a computer 74, which multiplies it by the constant factor $\lambda C/8RL$.

The rotation rate thus determined, $\Omega$, is displayed by an indicating device (not shown).

Figure 5:
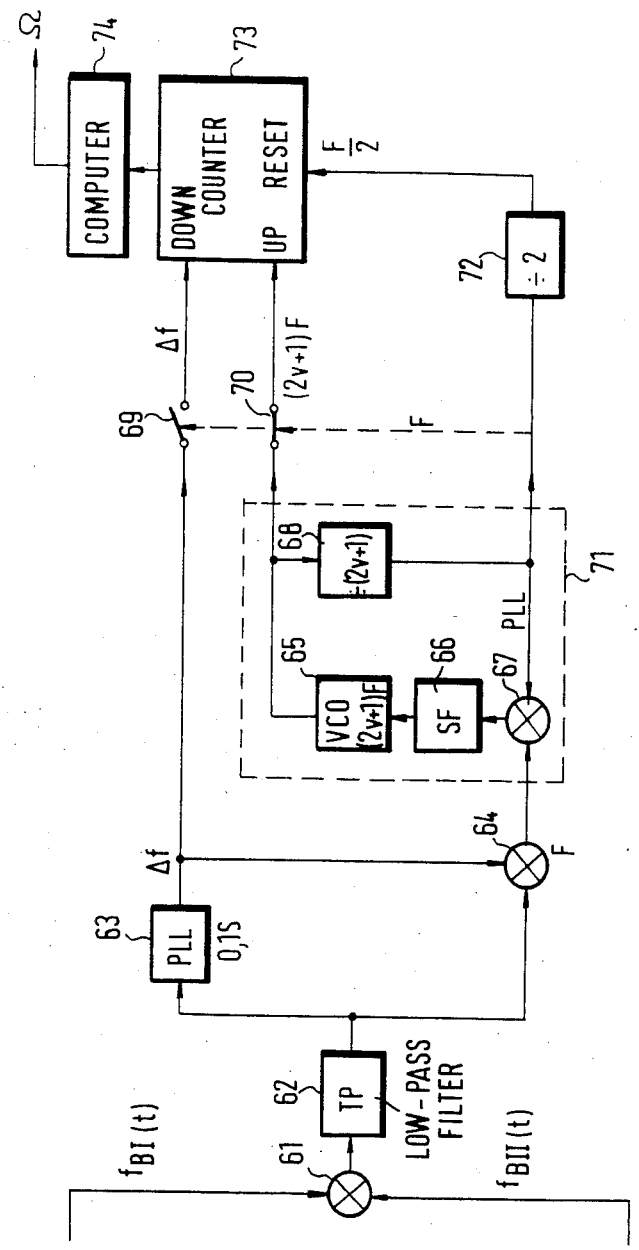
FIG. 5 is a block diagram of the evaluating portion of the novel instrument.

If the divider 72 is omitted in the evaluating facility of FIG. 5, the angle of rotation is obtained instead of the rotation rate $\Omega$.

I claim:

1. Rotation rate measuring instrument comprising a device producing a light beam which is split into two component beams ($I_{CW}$, $I_{CCW}$) which travel over a closed light path in opposite directions, wherein, after the component beams have traversed the light path, a phase difference ($\phi_s$) caused by the Sagnace effect and proportional to rotation rate ($\Omega$) exists between them, wherein the two component beams having traversed the light path are combined and directed to an optical-to-electrical-transducer (2) followed by a control and evaluating facility, wherein at least one modulator (5, 6) is provided which modulates at least one of the component beams in such a way that, after the two component beams have traversed the light path, periodically varying phase differences exist between them which are chosen so that the output signal of the optical-to-electrical transducer (2) has the same amplitudes at the varying phase differences when the measuring instrument is at rest, and wherein the drive signal for the modulator is so controlled that the output signal of the optical-to-electrical transducer has a constant amplitude even in the presence of rotation, characterized by means for so varying the drive signal for the modulator (5) as to periodically produce during each cycle a succession of phase differences $(2\nu+1)\pi/2$, $(2\nu+3)\pi/2$, $(2\nu+5)\pi/2$, and $(2\nu+3)\pi/2$ between the component beams, where $\nu$ is an arbitrary positive or negative integer, and that the drive signal exhibits changes in frequency by 2F, and means for determining the rotation rate $\Omega$ from the equation $$\Omega = \frac{\lambda C}{8RL} \frac{(2\nu+1)F - \Delta f}{F}$$

or from an equation derivable therefrom, where $\lambda$=vacuum wavelength of light, C=velocity of light in vacuo, R=radius of the coiled light path, L=length of the light path, and f=drive signal frequency shift required to compensate for the Sagnac phase difference $\Phi_S$.

2. An instrument as claimed in claim 1, characterized in that said varying means gives the drive signal a step-function waveform.

3. An instrument as claimed in claim 1, characterized in that two modulators are provided to each of which a different drive signal is applied.

4. An instrument as claimed in claim 3, characterized in that said varying means varies both of said drive signals such that they are square-wave signals separated in phase by one quarter-cycle.

5. An instrument as claimed in claim 4, characterized in that the frequency difference between the two drive signals has a staircase waveform.

6. An instrument as claimed in claim 3, characterized in that, to compensate for the Sagnac phase difference, said varying means includes means for shifting the frequency of one of the drive signals by $\Delta f$.

7. An instrument as claimed in claim 3, characterized in that, to compensate for the Sagnac phase difference, said varying means includes means for shifting the frequencies of both drive signals by $\Delta f/2$.

8. An instrument as claimed in claim 4, characterized in that, to compensate for the Sagnac phase difference, said varying means includes means for shifting the frequency of one of the drive signals by $\Delta f$.

9. An instrument as claimed in claim 5, characterized in that, to compensate for the Sagnac phase difference, said varying means includes means for shifting the frequency of one of the drive signals by $\Delta f$.

10. An instrument as claimed in claim 4, characterized in that, to compensate for the Sagnac phase difference, said varying means includes means for shifting the frequencies of both drive signals by $\Delta f/2$.

11. An instrument as claimed in claim 5, characterized in that, to compensate for the Sagnac phase difference, said varying means includes means for shifting the frequencies of both drive signals by $\Delta f/2$.

* * * * *